United States Patent [19]

Fields

[11] 3,870,947
[45] Mar. 11, 1975

[54] METHOD AND APPARATUS FOR MEASURING THE DWELL AND RPM OF AN ENGINE

[76] Inventor: Leslie L. Fields, Rt. 1, Anna, Ill. 62906

[22] Filed: Nov. 12, 1973

[21] Appl. No.: 414,951

[52] U.S. Cl. .............................................. 324/16 R
[51] Int. Cl. .......................................... G01r 29/00
[58] Field of Search ........... 324/15, 16 R, 16 T, 169

[56] References Cited
UNITED STATES PATENTS

| | | | |
|---|---|---|---|
| 3,594,634 | 7/1971 | Muller | 324/16 R |
| 3,704,445 | 11/1972 | Lanham | 324/169 |
| 3,763,420 | 10/1973 | Maisonville | 324/16 R |

OTHER PUBLICATIONS

J. D. Ekland et al.–Computer Controlled Distributor Tester–IBM Technical Disclosure Bulletin–12 (2)–July, 1969, pp. 259, 260.

Primary Examiner—Stanley T. Krawczewicz
Attorney, Agent, or Firm—Rogers, Ezell & Eilers

[57] ABSTRACT

This invention relates to a method and apparatus for measuring the dwell and r.p.m. of an internal combustion engine. The dwell measurement method and apparatus generally comprises means for generating a first pulse-type signal whenever the distributor points of the engine are in one position of their open and closed positions. The frequency of the first signal is selected to be substantially greater than and independent of the point frequency. A series of pulses, the number of which are proportional to the frequency of the first signal are produced and counted for a selected time interval, and means are provided for displaying a reading which is indicative of and respective to said count.

The r.p.m. measurement method and apparatus generally comprises means for generating a pulse-type signal, the frequency of which is proportional to the point frequency, and means for displaying a reading related and responsive to the frequency of said signal.

23 Claims, 5 Drawing Figures

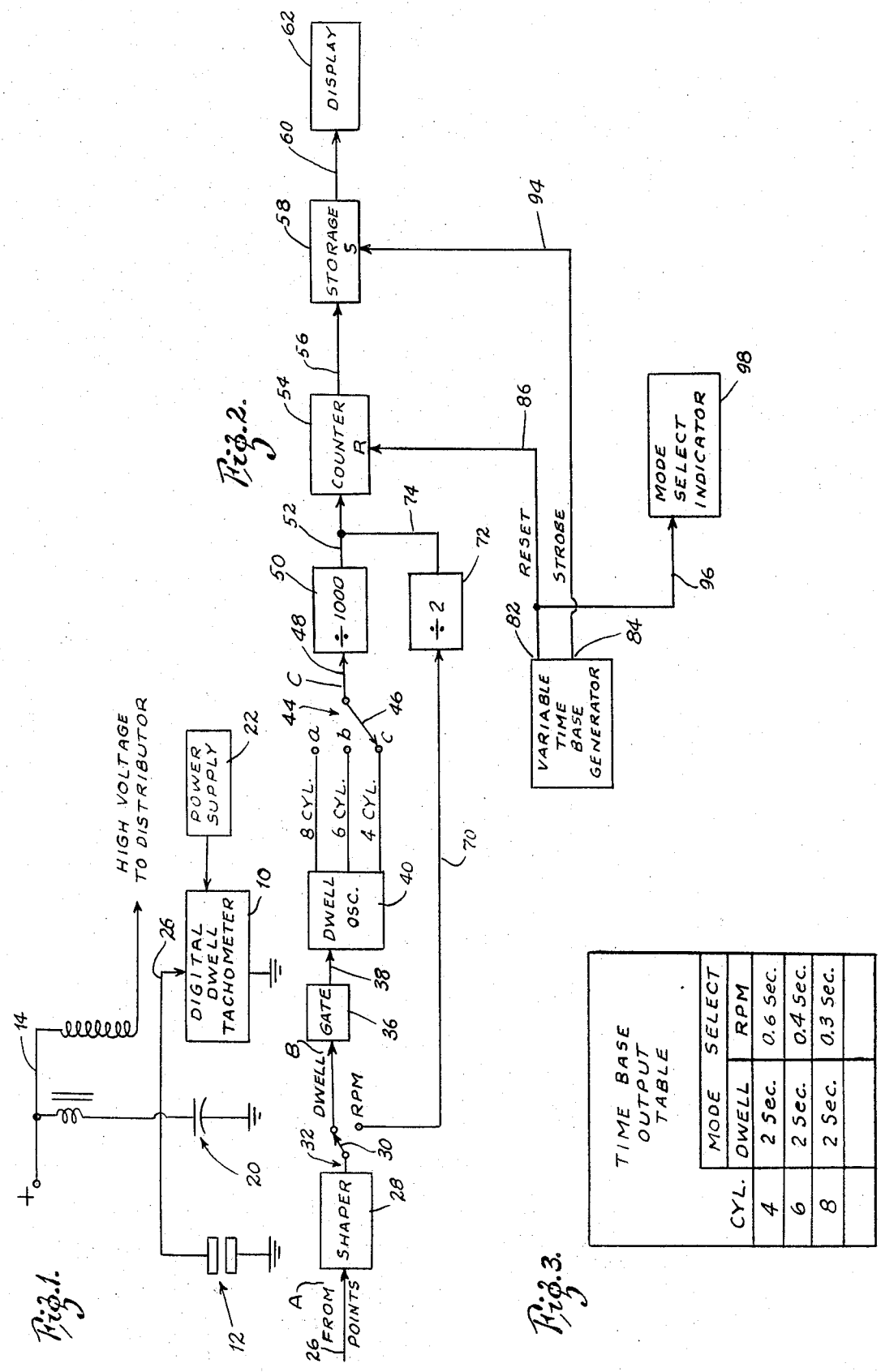

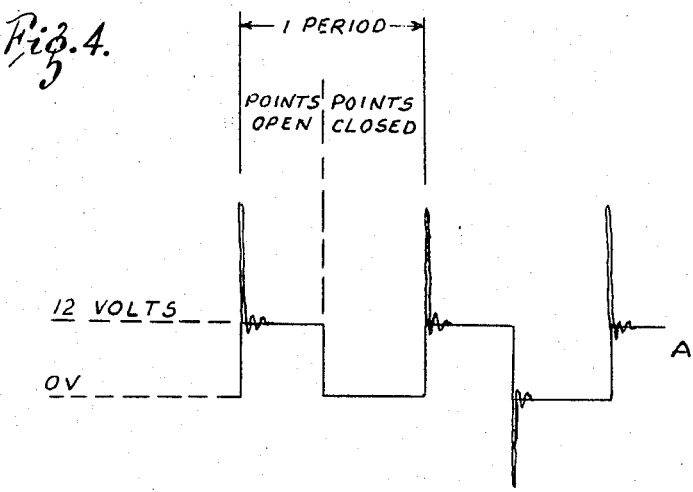
Fig.4.
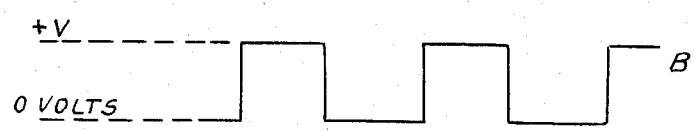
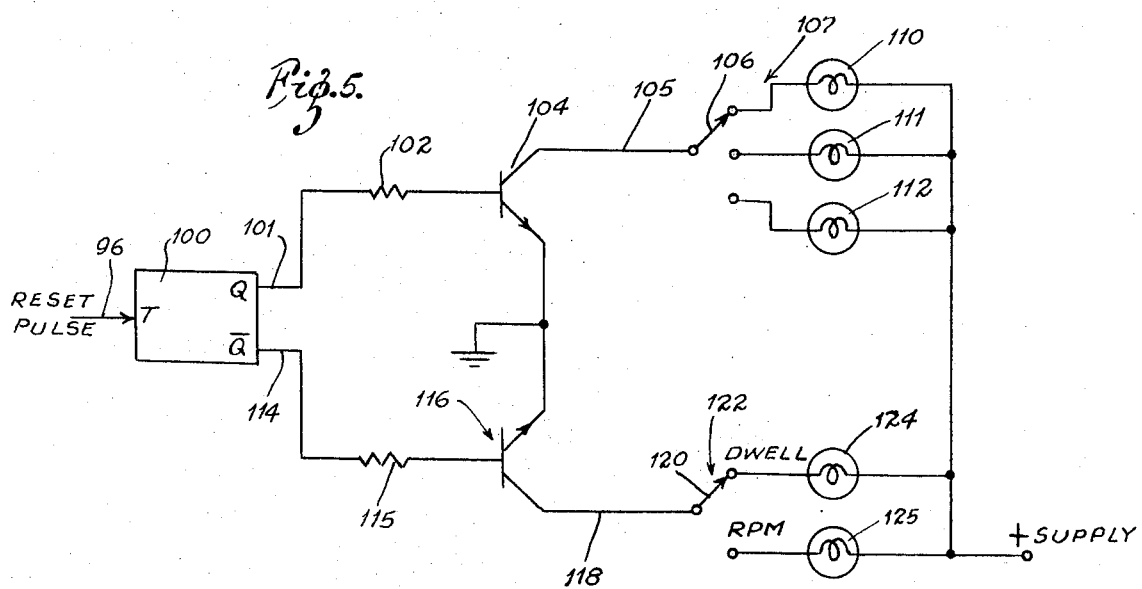
Fig.5.

METHOD AND APPARATUS FOR MEASURING THE DWELL AND RPM OF AN ENGINE

SUMMARY OF THE INVENTION

This invention relates to a method and apparatus for measuring the dwell and r.p.m. of an engine and particularly an internal combustion engine having a point-type ignition system.

Such devices are common in the art but possess certain disadvantages that this invention overcomes. For example, some of the prior art dwell meters use voltage control oscillator means for producing a digital signal, the frequency of which is proportional to the voltage at its input. The input voltage in turn is an average voltage proportional to the amount of time the points are closed. While such devices work, they are either unstable due to the inherent instability of voltage control oscillators, and therefore produce inaccurate or erratic readings, or the deVices are relatively complex and expensive due to the circuitry required to stabilize the readout.

This invention overcomes these disadvantages by providing a dwell meter of a digital type that is exceptionally accurate and stable without the need of such complex and expensive circuitry. This is accomplished by producing a digital signal, the frequency of which is substantially greater than and independent of the distributor point frequency, and which is constant for a given engine of a particular number of cylinders, by counting pulses, the frequency of which is proportional to the digital signal frequency, only when the points are in one position of their open and closed positions, and by making said count over a given time period.

More specifically, a dwell oscillator that produces a relatively high frequency digital signal of a selected frequency depending on the number of cylinders of the engine being tested, produces such a signal only when the distributor points are closed as determined by a gate network. The high frequency signal is then divided by a selected factor and the pulses on the resultant digital signal counted by a counter network. A variable time base generator produces a series of pulses of a given frequency, which pulses are used to reset the counter. The count from the counter is continuously fed to a storage network. The variable time base generator also produces a strobe signal of the same frequency as the reset signal with each pulse of the strobe signal occurring in time only slightly before the corresponding pulse of the reset signal. These strobe pulses are fed to the strobe input of the storage device to transfer the accumulated count to its output which in turn is fed to a suitable driver and display device which directly indicates the dwell reading. The longer the points are closed during the counting period, the more pulses will be counted by the counter and the greater will be the reading on the display. By appropriately selecting the dwell oscillator and time base generator frequencies and the division factor, the display can be made to read the dwell directly in degrees.

The system of this invention also includes an r.p.m. mode wherein a signal is generated having a frequency of that of the point frequency. This signal is then divided by a factor and the result fed to a counter where it is counted for a given time period, which period is also set in accordance with a reset signal from the time base generator. The count from the counter is fed to the storage device which upon receipt of a strobe pulse from the time base generator transfers the count to a display device to indicate the r.p.m. By appropriately selecting the division factor and the period of the time base generator, the display device can be made to give a reading which is a factor of 10 of the actual r.p.m. A different time base is selected for each engine being tested depending on its number of cylinders.

Also included in this invention is a mode select indicator which indicates whether the device is in the dwell mode or the r.p.m. mode and also indicates whether it is set for a four-cylinder, six-cylinder, eight-cylinder engine, or the like.

Hence, it is a primary object of this invention to provide a method and apparatus for measuring dwell which is exceptionally accurate and stable, and which is relatively inexpensive and simple in design.

It is another object of this invention to provide a combination dwell meter and tachometer in one unit and using common circuitry whereby either the dwell or r.p.m. mode may be selected quickly and easily.

These and other objects of the invention will become apparent from the drawings and detailed description to follow.

DESCRIPTION OF THE DRAWING

FIG. 1 is an electrical schematic diagram showing a digital dwell tachometer of this invention connected in the ignition circuit of an engine to test the dwell or r.p.m. of the engine;

FIG. 2 is a more detailed electrical schematic diagram of the digital dwell tachometer of FIG. 1;

FIG. 3 is a table showing selected periods of the time base generator output for a preferred embodiment of the invention;

FIG. 4 is a series of waveforms illustrating the outputs at various locations of the network of FIG. 2; and FIG. 5 is a more detailed electrical schematic diagram of the mode select indicator shown in the network of FIG. 2.

DETAILED DESCRIPTION OF A PREFERRED EMBODIMENT

Referring to FIG. 1, there is generally shown a digital dwell tachometer 10 of this invention connected in the ignition system of an internal combustion engine, the ignition system generally including a set of points 12 which are customarily located in the distributor housing (not shown) of the engine and are oscillated between open and closed positions by means of a cam (not shown) in a manner commonly known in the art. A spark plug fires each time the points are open and close, and for example on an eight-cylinder engine this is 4 times per revolution of the engine crankshaft, on a six-cylinder engine, 3 times per revolution of the crankshaft, and on a four-cylinder engine, 2 times per revolution of the crankshaft. Assuming a negative ground system, one side of the points is grounded, and the other side is connected to one side of the low voltage winding of a spark coil 14, the other side of the low voltage winding being connected to the positive side of the engine power supply. One side of the high voltage winding of the spark coil 14 is also connected to the positive supply voltage and the other side connected to the engine distributor (not shown) in a manner commonly known. A condenser 20 is connected in parallel with the points 12 as is the digital dwell tachometer 10. The components of the digital dwell tachometer 10 are powered by means of a suitable power supply 22 which can be of any suitable design commonly known in the art to produce the necessary voltage for the network 10. The power supply 22 in turn may get its supply from the engine battery, a 110 v. A.C. source, or the like.

Initially, it should be noted that dwell is measured in degrees and represents the total number of degrees the points are closed between two successive lobes of the point operating cam. For example, assuming a four cycle engine, on an eight-cylinder engine, having one spark plug per cylinder, the number of degrees between successive lobes is 45°, on a six-cylinder engine, the number of degrees between lobes is 60°, and on a four-cylinder engine, the number of degrees between lobes is 90°. Hence, the maximum dwell reading if the points were closed all the time would be 45° for an eight-cylinder engine, 60° for a six-cylinder engine, and 90° for a four-cylinder engine. This is not to say that these readings are normal operating readings since the engine could not possibly operate with the points closed all the time. These represent only the maximum possible reading on the digital dwell tachometer for these engines. It should also be pointed out that while the digital dwell tachometer 10 to be hereinafter described is designed for testing the dwell and r.p.m. for these three types of engines, the principles and features of this invention to be described could also be used to make such tests on engines having different numbers of cylinders.

The r.p.m. of the engine is simply the number of revolutions per minute made by the crankshaft.

With these definitions in mind and referring to the network of FIG. 2, the digital dwell tachometer 10 will now be described in more detail.

A conductor 26 connected to the nongrounded side of the points 12 sends a signal produced by the oscillation of the points 12 between open and closed positions, which signal looks generally as shown by waveform A of FIG. 4, to a shaper network 28. For each period of the waveform A the first portion of the waveform occurs when the points 12 are open and the second portion occurs when the points 12 are closed. The waveform, of course, repeats as long as the engine is running. The shaper network 28 merely eliminates the spurious signals shown in waveform A to produce the cleaner waveform B which is the same frequency and has a first portion of each period equal in length to the first portion in waveform A and a second portion equal in length to the second portion of waveform A. The output from the shaper network 28 is fed to the wiper arm 30 of a select switch 32 which has a dwell position and an r.p.m. position. The dwell position of the switch 32 is connected by a lead 34 to the input of a gate network 36, the output of which is connected by a conductor 38 to the input of a dwell oscillator 40.

The dwell oscillator 40 produces a selected high frequency pulse type signal at each of its outputs a, b, or c at times dictated by the gate circuit 36. The oscillator 40 has a suitable select means whereby the operator can select a given frequency to be generated at a corresponding one of the outputs a, b, or c in accordance with the number of cylinders of the engine being tested. In this described embodiment of the invention the output a represents an eight-cylinder engine and if appropriately selected produces thereon a 22.5 KHz. signal, the output b represents a six-cylinder engine and if appropriately selected produces thereon a 30 KHz. signal, and the output c represents a four-cylinder engine and if appropriately selected produces thereon a 45 KHz. signal. Regardless of which of the frequencies is selected, the high frequency signal is generated on the selected one of the outputs only during the second portion of the waveform B for each period of the waveform B as governed by the gate network 36. Hence, the gate network 36 insures that the dwell oscillator 40 produces the selected output signal only during the second portion of each period of the waveform B. Waveform C illustrates generally the appearance of the waveform at the selected output of the oscillator 40, it being understood that the waveform C is illustrative only, and in fact varies in frequency depending on the number of cylinders and the selection made.

The outputs a, b, and c from the dwell oscillator 40 are connected to one side of a switch 44, the wiper arm 46 of which is connected by a conductor 48 to a division network 50 which in this embodiment of the invention divides the signal appearing at its input by a thousand. The output of the network 50 is fed by a conductor 52 to the input of a digital counter 54 which counts the pulses at its input and feeds them by a conductor means 56 to the input of a storage network 58. The counter 54 has a reset input R such that each time it receives a pulse at its reset input the counter resets to zero and starts counting over again the pulses appearing at its input. The storage network 58 also has a strobe input S which transfers the accumulated count to its output each time it receives a pulse at its strobe input S. The output count from the storage network 58 is fed through a conductor means 60 to a suitable display device 62 which includes a driver and preferably a digital readout means for directly indicating the count at the output of the storage circuit 58.

The r.p.m. terminal of the switch 32 is connected by a conductor 70 to the input of a division network 72 which in this preferred embodiment of the invention divides the signal at its input by two. The output of the network 72 is fed by a conductor 74 to the input of the counter 54.

A variable time base generator 80 has a reset output 82 and a strobe output 84. The generator 80 generates a series of pulses at its reset output 82 at a frequency that may be selected by the operator by means of a suitable select switch or the like. It also generates a series of pulses at its strobe output 84 of the same frequency as the pulses at its reset output except that each pulse at the strobe output occurs in time just slightly before a corresponding pulse at the reset output. Hence, each pulse of the strobe output waveform might occur a few microseconds before the corresponding pulse at the reset output. The frequency of the pulses at the outputs of the generator 80 are selected depending on whether the system is in the dwell or r.p.m. mode, and if in the r.p.m. mode, depending on the number of cylinders of the engine being tested. The table of FIG. 3 gives the periods between successive pulses at the outputs of the generator 80 for the different modes and cylinders in this described embodiment. It will be noted that in the dwell mode a 2-second period is used regardless of the number of cylinders, and in the r.p.m. mode a 0.6-second period is used for a four-cylinder engine, a 0.4-second period for a six-cylinder engine, and a 0.3-second period for an eight-cylinder engine.

The generator 80 is of a type commonly known in the art, as are the other individual circuits shown in FIG. 2, and is therefore not described in detail.

The signal at the reset output 82 of the generator 80 is fed through a conductor 86 to the reset input of the counter 54. The signal at the strobe output 84 is fed through a conductor 94 to the strobe input of the storage network 58. The reset signal is also fed through a conductor 96 to the input of a mode select indicator 98, which is a network that indicates to the operator the mode in which he is operating and which will be described hereinafter in more detail.

Hence, it can be seen that the counter 54 is reset for each pulse occurring at the reset output 82 of the time base generator 80, and the storage network 58 is reset each time a pulse occurs at the strobe output 84 so that the storage network is reset a very short time after the counter to transfer the count to the display device 62.

Operation

Dwell Mode. The dwell mode operation will first be described. In addition to the definition of dwell described above, it should further be noted that a direct indication of dwell on the display 62 is desirable so that the operator can read the dwell directly in degrees and not have to interpret.

To calibrate the network of FIG. 2 to read the dwell directly on the display 62, it is only necessary to properly select the frequency of the time base generator 80, the frequency of the dwell oscillator 40, and the division factor of the network 50 to produce a direct readout. As noted above, the maximum dwell for an eight-cylinder four cycle engine is 45°, for a six-cylinder four cycle engine, 60°, and for a four-cylinder four cycle engine, 90°. This would represent the points being closed all the time so that the dwell oscillator 40 would be oscillating all the time. There are, of course, many combinations of these three factors that will produce a direct reading, but for accuracy it is desirable to set the time base of the generator 80 so that it is at least several times greater than the period of one point cycle and preferably even several times greater than the period of each engine revolution. In this way a more stable and accurate reading can be obtained. Otherwise, the variations in the amount of time the points are closed from one point cycle to another would cause the readings to continuously change and make it difficult for the operator to set the dwell. In this described embodiment, the period of the time base oscillator is set at 2 seconds.

It is also desirable that the frequency of the dwell oscillator 40 for each engine being tested based on its number of cylinders be quite high in comparison to the point frequency in the engine r.p.m. range where dwell is normally measured. It will be noted that the frequency of the dwell oscillator 40 must be at least 45 times greater than the point frequency for measuring dwell on an eight-cylinder engine, 60 times greater on a six-cylinder engine, and 90 times greater on a four-cylinder engine. While dwell is normally measured at an r.p.m. of about 700, the system of this described embodiment will allow the measurement of dwell at any r.p.m. between 100 and about 5,000 for an eight-cylinder engine because of the frequencies selected.

The factor of 1,000 was selected for the division network 50 so as to greatly reduce the error factor and produce a very reliable, accurate, and stable reading. With the time base of the generator 80 selected at 2 seconds, and the division factor of the network 50 at 1,000, the frequency of the dwell oscillator 40 for measuring an eight-cylinder engine is selected at 22.5 KHz., for measuring a six-cylinder engine, 30 KHz., and for measuring a four-cylinder engine, 45 KHz.

Using an eight-cylinder engine as an example, and supposing the points are closed all the time, with the values selected in this embodiment the indication on the display device 62 should be 45 since this is the maximum dwell for an eight-cylinder engine. With the points closed all the time, the waveforms A and B are really just lines at zero volts so that the dwell oscillator 40 is continuously generating a 22.5 KHz. signal at its output $a$. With the switch 44 in the $a$ position, this signal will be divided by 1,000 by the network 50 so that the frequency at the input of the counter 54 is 22.5 Hz. When a pulse occurs at the reset output 82 of the time base generator 80, this pulse resets the counter 54 to begin counting the pulses at its input. This count is delivered by the conductor 56 to the input of the storage device 58 where it is temporarily stored. Two seconds after the occurrence of the first pulse at the reset output 82 a second pulse occurs and resets the counter 54 to start counting over again. However, an instant before the occurrence of the second reset pulse, a strobe pulse occurs at the strobe output 84 of the time base generator 80 and transfers the accumulated count of the storage device 58 to its output and through the conductor means 60 to the display 62. Hence, the count shown on the display 62 represents the number of pulses counted by the counter 54 in a 2-second period. Since the frequency of the signal at the input of the counter 54 is 22.5 Hz., and since the counter 54 counts for 2 seconds, the count appearing on the display 62 is 45 which is a direct reacing of the dwell on an eight-cylinder engine with the points closed all the time.

When the engine is functioning under normal conditions with the points 12 opening and closing as shown in the waveforms A and B, the dwell oscillator 40 generates the signal at its output $a$ only when the points are closed, as dictated by the gate circuit 36, such that the number of pulses counted by the counter 54 are proportionately less during the 2-second period as is the count shown on the display 62 which is a direct reading of the actual dwell. This same analysis holds ture for a six-cylinder engine and four-cylinder engine wherein a 30 KHz. and 45 KHz. signal, respectively, is selected to be generated at the outputs $b$ and $c$, respectively, of the dwell oscillator 40. Since the period of the time base generator 80 is 2 seconds, the reading on the display 62 is updated every 2 seconds.

It should be noted that while the gate circuit 36 is this described embodiment is of the type that enables the dwell oscillator 40 to start oscillating at the instant the points close and disables it to stop oscillating at the instant the points open, the dwell oscillator could also be made to run all the time with the gate circuit 36 being of a type that gates the selected signal from the oscillator 40 to the division network only when the points are closed.

R.P.M. Mode. To measure r.p.m. the gate circuit 36, dwell oscillator 40, and division network 50 are not used. The remainder of the circuit, however, operates basically the same with an addition of a division network 72 as will be explained.

It should be noted that a measurement of r.p.m. is directly proportional to the point frequency. That is, for any given engine the points open and close a constant number of times per revolution. On an eight-cylinder four cycle engine they open and close 4 times, on a six-cylinder four cycle engine, 3 times, and on a four-cylinder four cycle engine 2 times. Also, it is desirable to produce an r.p.m. reading on the display 62 which can be read quickly and without difficult interpretation.

Assuming an eight-cylinder engine is turning at 1,000 r.p.m., the point signal at the input of the shaper network 28, and as shown in waveform A of FIG. 4, is 4,000 cycles per minute or 66.67 Hz. which is also the frequency of the signal at the output of the network 28 which is then divided by two by the network 72 so that the signal at the input of the counter 54 has a frequency of 33.33 Hz. Assuming the display is to read 10 when the r.p.m. is 1,000, a time base of 0.3 second is selected for the variable time base generator. With a time base of 0.3 second the counter 54 counts 10 pulses before being reset and the count 10 is displayed on the device 62 representing 1,000 r.p.m.

It can be seen that a measurement as low as 100 r.p.m. can be made using these values which would be indicated as a 1 on the display device 62. It can also be seen that the display device could be made to read 100, 1,000, or higher for 1,000 r.p.m., but this would require the use of a longer time base. Because r.p.m. varies rather rapidly on most engines, a short time base is desirable to enable the operator to recognize the variations and hence 0.3 second is preferred. The divide-by-two network 72 helps prevent readout flicker and thereby produces a more stable reading.

As will be noted from the table of FIG. 3, to produce a display reading of 10 at an engine speed of 1,000 r.p.m. for a four-cylinder engine, a time base of 0.6 second is used, and for a six-cylinder engine a time base of 0.4 second is used. With the system so calibrated, the display 62 will give a reading of 1/100 of the actual r.p.m. of the engine.

In FIG. 5, the mode select indicator 98 is shown in more detail. Its purpose is to indicate to the operator whether he is in the dwell or r.p.m. mode, and whether he is in the proper setting for the number of cylinders of the engine being tested.

The strobe pulse from the strobe output 84 of the variable time base generator 80 is fed to the trigger input of a flip-flop 100 which has a Q and $\overline{Q}$ output. The flip-flop 100 is a type that produces a 1 level signal at one output and a 0 level signal at the other output, with the levels of the outputs reversing each time a pulse is received at its trigger input. The Q output is connected by a conductor 101 and resistor 102 to the base of a transistor 104. The emitter of the transistor 104 is connected to ground. Its collector is connected through a conductor 105 to the wiper arm 106 of a switch 107 having three terminals representing a four-cylinder, six-cylinder, and eight-cylinder engine, respectively. The terminal representing the four-cylinder engine is connected through a lamp 110 to a positive supply, the terminal representing a six-cylinder engine is connected through a lamp 111 to the positive supply, and the terminal representing an eight-cylinder engine is connected through a lamp 112 to the positive supply.

The $\overline{Q}$ output of the flip-flop 100 is connected by a conductor 114 and resistor 115 to the base of a transistor 116. The emitter of the tranistor 116 is connected to ground and its collector is connected through a conductor 118 to the wiper arm 120 of a switch 122 which has one terminal representing the dwell mode and another representing the r.p.m. mode. The terminal representing the dwell mode is connected through a lamp 124 to the positive supply and the terminal representing the r.p.m. mode is connected through a lamp 125 to the positive supply.

Operation of the Mode Select Indicator

Each time a pulse is received from the reset output of the time base generator 80, which is every 2 seconds in the dwell mode regardless of the number of cylinders, every 0.3 second in the r.p.m. mode for an eight-cylinder engine, 0.4 second for a six-cylinder engine, and 0.6 second for a four-cylinder engine, the flip-flop 100 changes state. Hence, assuming the Q output is at a 1 level, the transistor 104 conducts and an appropriate one of the lamps 110, 111, or 112 lights depending on the setting of the switch 106 which is ganged to the switch 44. Both are ganged to a suitable switch on the variable time base generator to select the appropriate time base. Since the flip-flop 100 is constantly changing states, the lamp will blink on and off indicating to the operator whether his cylinder selection is correct for the engine being tested. When the flip-flop 100 changes states, the $\overline{Q}$ output is at a 1 level which turns on the transistor 116 and lights the appropriate lamp 124 or 125 depending on whether he is set in the dwell mode or r.p.m. mode. By observing the blinking lights, the operator can tell whether the apparatus is in the proper mode and properly set for the number of cylinders of the engine being tested.

Hence, there has been described a novel method and apparatus for measuring the dwell and r.p.m. of an engine having a point-type ignition system inexpensively and with exceptional accuracy.

Various changes and modifications may be made in this invention, as will be readily apparent to those skilled in the art. Such changes and modifications are within the scope and teaching of this invention as defined by the claims appended hereto.

What is claimed is:

1. Apparatus for measuring the dwell of an internal combustion engine having distributor points which oscillate between open and closed positions during engine operation, the apparatus comprising means for generating a first oscillating signal whenever the distributor points are in one condition, the frequency of the first signal being substantially greater than and independent of the point frequency, means for generating second signals representing a count, the count being related to the number of first signal oscillations generated during a selected time interval, and means for generating a display indicative of said count.

2. The apparatus of claim 1 wherein the frequency of the first signal when it is being generated is constant for a given engine being tested.

3. The apparatus of claim 1 further comprising counter means for generating said second signals, means for generating a time base signal of a selected frequency, and means to reset said counter means to begin recounting in response to said time base signal.

4. The apparatus of claim 3 further comprising means for generating a time base signal of a selected frequency independent of the point frequency.

5. The apparatus of claim 1 wherein the first signal is generated whenever the points are closed.

6. The apparatus of claim 1 further comprising means for generating a waveform in response to and indicative of the operation of the points between open and closed positions, and means responsive to said waveform for enabling the first signal generating means to begin generating whenever the points are in the one position and disabling the first signal generating means to stop generating whenever the points are in the other position.

7. The apparatus of claim 1 further comprising means for producing a third oscillating signal in response to said first signal, the frequency of which is equal to the frequency of said first signal divided by a selected factor, said second signals being generated in response to said third signal and representing a count equal to the number of oscillations of said third signal produced during the selected time interval.

8. The apparatus of claim 1 further comprising means for selecting the frequency of said first signal depending on the number of cylinders of the engine being tested.

9. The apparatus of claim 8 further comprising means for selecting the frequency of the first signal and the time interval to generate a direct display of the dwell reading in degrees for an engine of a given number of cylinders.

10. The apparatus of claim 8 further comprising means for selecting a frequency for the first signal for testing an eight-cylinder four-cycle engine of at least 45 times greater than the point frequency, for testing a six-cylinder four-cycle engine, at least 60 times greater than the point frequency, and for testing a four-cylinder four-cycle engine, at least 90 times greater than the point frequency.

11. The apparatus of claim 10 further comprising means for selecting the time interval to generate a dwell reading representing an average over several point cycles.

12. Apparatus for measuring the dwell and r.p.m. of an internal combustion engine having distributor points which oscillate between open and closed positions during engine operation, the apparatus comprising means for selecting between a dwell mode and r.p.m. mode for measuring the dwell and r.p.m., respectively, of the engine, means when in the dwell mode for generating a first oscillating signal whenever the distributor points are in one position, the frequency of the first signal being substantially greater than the point frequency and being independent of point frequency, means when in the r.p.m. mode for generating a second oscillating signal the frequency of which is proportional to the point frequency, means for generating third signals representing a count, the count being related to the number of first signal oscillations generated during a selected time interval when in the dwell mode and being related to the number of second signal oscillations generated during a selected time interval when in the r.p.m. mode, and means for generating a display indicative of said count when in either mode.

13. The apparatus of claim 12 further comprising counter means for generating said third signals, means for generating a time base signal of a selected frequency, and means to reset said counter means to begin recounting in response to said time base signal when in either mode.

14. The apparatus of claim 12 further comprising means for producing a fourth oscillation signal in response to said first signal the frequency of which is equal to the frequency of said first signal divided by a first selected factor when in the dwell mode, and in response to said second signal the frequency of which is equal to the frequency of said second signal divided by a second selected factor when in the r.p.m. mode, said third signals being generated in response to said fourth signal in either mode and representing a count equal to the number of oscillations of said fourth signal produced during the selected time interval.

15. The apparatus of claim 13 further comprising means for selecting the frequency of the time base signal when in the r.p.m. mode depending on the number of cylinders of the engine being tested.

16. The apparatus of claim 15 further comprising means responsive to the mode selection and the frequency selections of the first generating means and time base generating means for indicating the mode setting of the apparatus and its setting relative to the number of cylinders of the engine being tested.

17. A method for measuring the dwell of an internal combustion engine having distributor points which oscillate between open and closed positions during engine operation, the method comprising the steps of generating a first oscillating signal whenever the distributor points are in one condition such that the frequency of the first signal is substantially greater than and independent of the point frequency, generating second signals in response to said first signal, said second signals representing a count, said count being related to the number of first signal pulses generated during a selected time interval, and generating a display indicative of said count in response to said second signals.

18. The method of claim 17 wherein said first signals are generated at a constant frequency during the time it is generated for a particular engine being tested.

19. The method of claim 17 further comprising the step of generating a time base signal of a selected frequency, counting a number of occillations proportional to the first signal oscillations generated during a selected time interval determined by the frequency of the time base signal, and continually recounting oscillations proportional to the number of first signal oscillations generated during recurring time intervals of the same length as the selected time interval in response to said time base signal.

20. The method of claim 19 further comprising the step of generating a time base signal of a selected frequency which remains constant with variations in point frequency.

21. The method of claim 17 wherein said first signal is generated whenever the points are closed.

22. The method of claim 17 including the step of selecting the frequency of the first signal and the time interval for an engine of a given number of cylinders to generate a direct display of the dwell reading in degrees.

23. The method of claim 17 wherein the time interval is selected to generate a dwell reading representing an average over several point cycles.

* * * * *